US005174590A

United States Patent [19]

Kerley et al.

[11] Patent Number: 5,174,590

[45] Date of Patent: Dec. 29, 1992

[54] COMPLIANT WALKER

[75] Inventors: James J. Kerley, Greenbelt; Wayne D. Eklund, Edgewood; J. Allen A. Crane, Baltimore, all of Md.

[73] Assignee: The United States of America as represented by the Administrator of the National Aeronautics & Space Administration, Washington, D.C.

[21] Appl. No.: 725,111

[22] Filed: Jul. 3, 1991

[51] Int. Cl.[5] ............ B62D 51/04

[52] U.S. Cl. ............ 280/1.5; 280/290; 280/87.051; 482/69; 482/68

[58] Field of Search ............ 280/1.5, 290, 304.4, 280/87.041, 87.051, 47.41, 250.1; 180/65.1; 482/69, 68, 66

[56] References Cited

U.S. PATENT DOCUMENTS

| | | | |
|---|---|---|---|
| 923,556 | 6/1909 | Miller | 482/68 |
| 2,719,568 | 10/1955 | Webb | 482/69 X |
| 3,252,704 | 5/1966 | Wilson | 482/68 |
| 3,721,437 | 3/1973 | Skaricic | 280/87.051 X |
| 3,730,587 | 5/1973 | Bloxham et al. | 482/69 X |
| 3,778,052 | 12/1973 | Andow et al. | 280/87.041 |
| 3,872,945 | 3/1975 | Hickman et al. | 280/87.041 X |
| 4,211,426 | 7/1980 | Motloch | 280/87.041 |
| 4,941,497 | 7/1990 | Prather et al. | 482/68 |
| 4,946,421 | 8/1990 | Kerley, Jr. | 464/56 |
| 4,981,307 | 1/1991 | Walsh | 280/290 |

FOREIGN PATENT DOCUMENTS

| | | | |
|---|---|---|---|
| 536568 | 6/1958 | Italy | 280/87.051 |

*Primary Examiner*—Charles A. Marmor
*Assistant Examiner*—Kevin Hurley
*Attorney, Agent, or Firm*—Paul S. Clohan, Jr.; R. Dennis Marchant; Guy M. Miller

[57] ABSTRACT

A compliant walker for humans having limited use of their legs and lower back includes an upright wheeled frame which at least partially surrounds an upright user wearing a partial body harness which is attached to the frame by means of cable compliant apparatus consisting of sets of cable segments and angle bracket members connected between opposite side members of the frame and adjacent side portions of the harness. The type of partial body harness utilized takes two forms, the first being a torso harness which encircles the waist or rib cage of the user, while the second type of harness is a hip harness which fits around the hips and buttocks. The frame itself lends itself to several embodiments, one of which completely surrounds the user, while the other consists of a frame open at the front end including a pair of upright side members which attach to the cable support apparatus and which is vertically adjustable to accommodate the user's height.

23 Claims, 6 Drawing Sheets

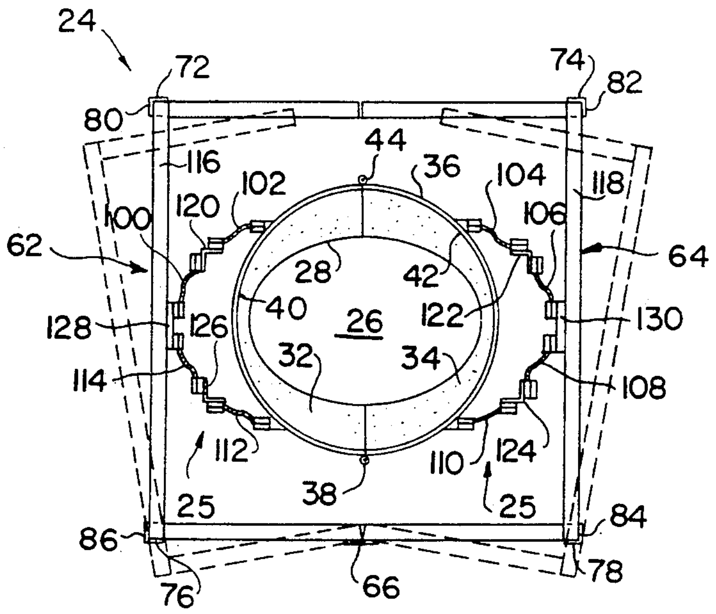
FIG. 1
FIG. 4
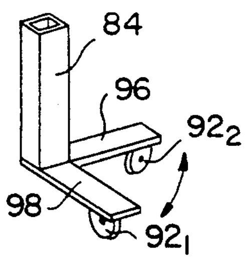
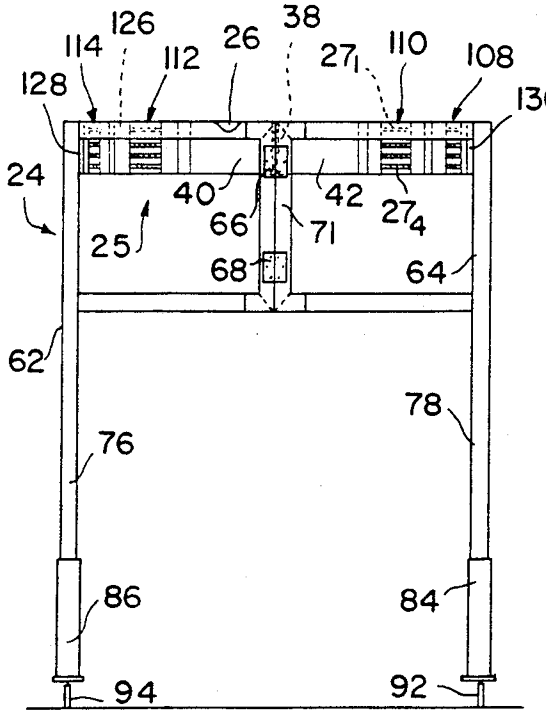
FIG. 2
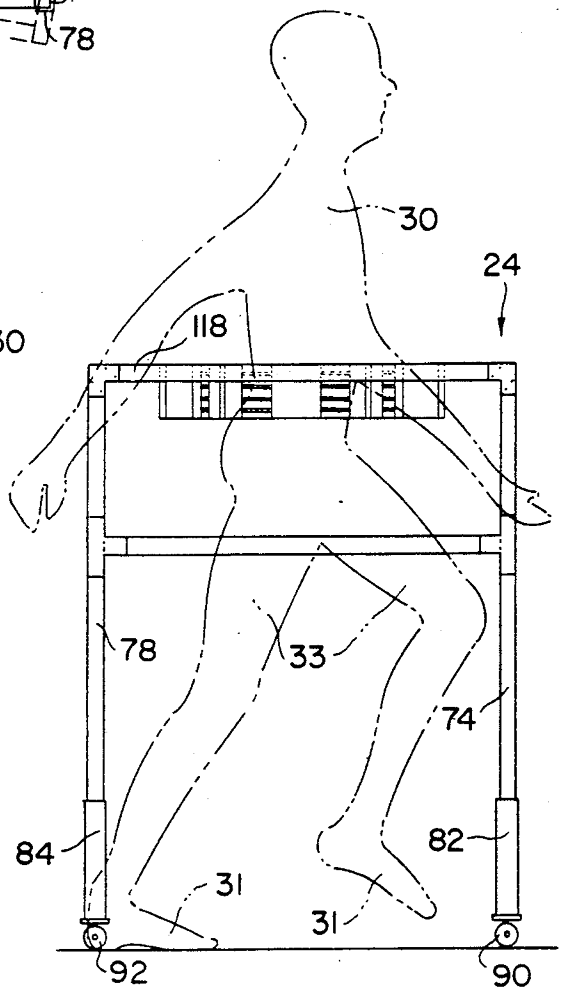
FIG. 3

FIG. 11
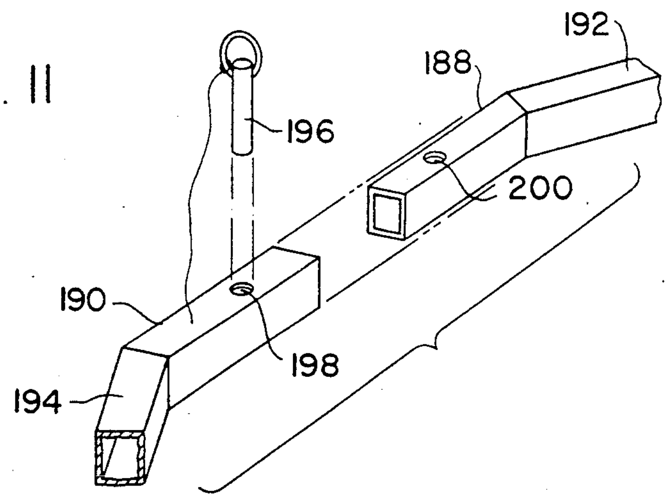
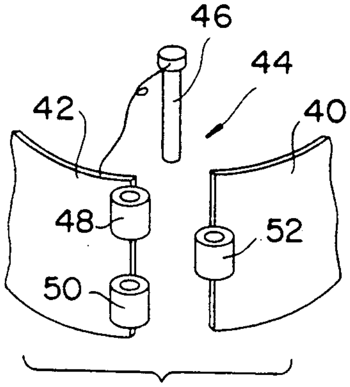
FIG. 12
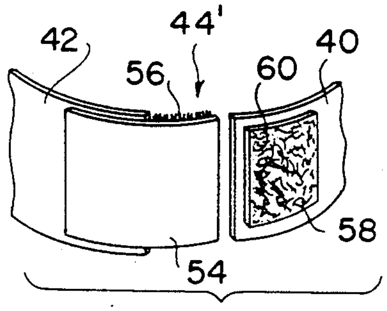
FIG. 13
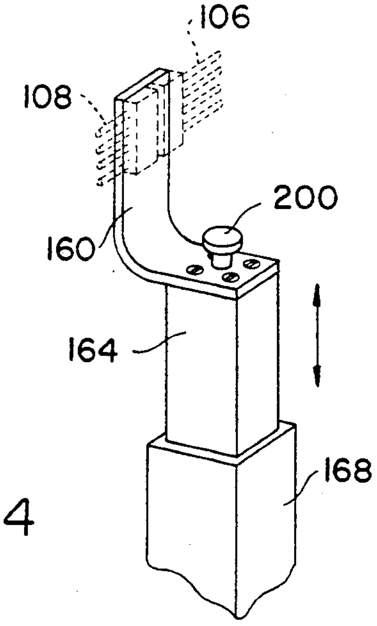
FIG. 14
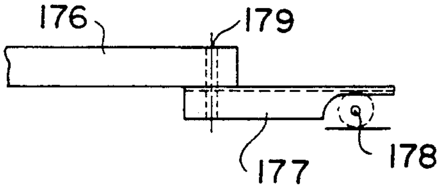
FIG. 15
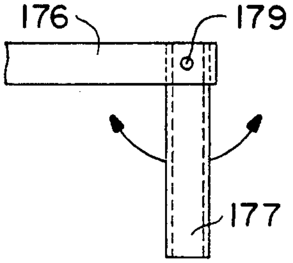
FIG. 16

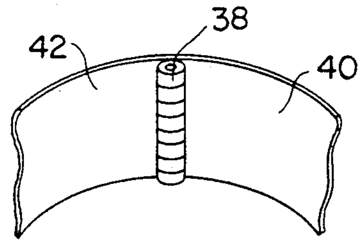
FIG. 17
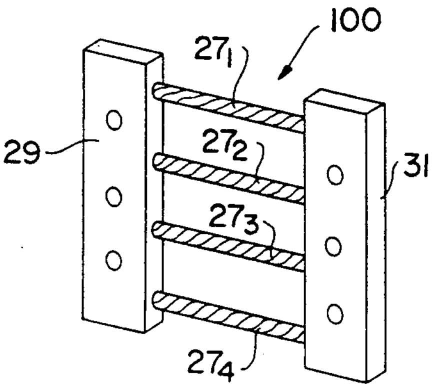
FIG. 18
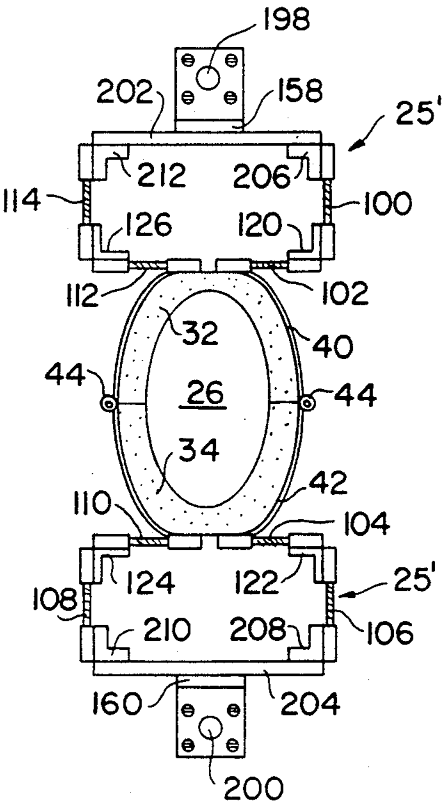
FIG. 19
FIG. 23
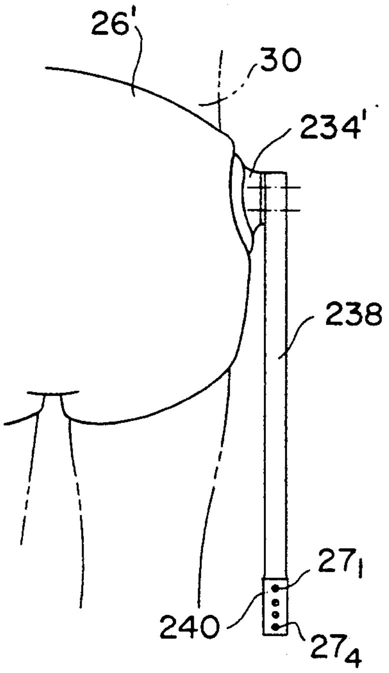

COMPLIANT WALKER

ORIGIN OF THE INVENTION

The invention described herein was made in the performance of work under a NASA contract and by an employee of the United States Government and is subject to the provisions of Section 305 of the National Aeronautics and Space Act of 1958, Public Law 85-568 (72 Stat. 435; 42 U.S.C. §2457), and may be manufactured and used by or for the Government for governmental purposes without the payment of any royalties thereon or therefor.

BACKGROUND OF THE INVENTION

Technical Field

This invention relates generally to a mobile support system for the human body and more particularly to a cable compliant support system for dynamically supporting persons having limited use of their lower extremities.

Background Art

Numerous devices presently exist for supporting injured or post operative patients and handicapped persons having limited use of his or her legs. By this is meant those devices which permit such persons to become ambulatory under their own power. Such devices include crutches, wheelchairs and upright walkers, to name a few.

Also known in the prior art are what is known as compliant devices and more particularly cable compliant devices which heretofore have been utilized, for example, to provide some degree of shock and/or vibration protection as well as correcting for variations, and misalignments between the two devices which are brought together under some external control.

Robot technology has found a need to position an element at a certain location where there exists a possibility of substantial side and angular misalignment between parts which are to become mutually engaged. Such apparatus is taught, for example, in U.S. Pat. No. 4,946,421, entitled, "Robot Cable-Compliant Devices" issued to James J. Kerley, Jr., one of the present inventors, on Aug. 7, 1990, and which is herein meant to be incorporated by reference. The compliant device disclosed therein is comprised of at least two sets of cable segments whose longitudinal axes lie in at least two planes and couple to two orthogonal frame members by angle brackets which interconnect the cables to the frames. Depending upon the stiffness imparted to the cable segments, six degrees of freedom are provided to translate along mutually orthogonal X, Y and Z axes as well as to rotate around each of these axes. These six degrees of freedom are referenced to a single point, that point being the center of the compliance device lying along the central longitudinal axis thereof.

Heretofore, this technology has not been utilized in connection with mobile assistance devices for enabling permanently or temporarily handicapped persons to regain their mobility.

SUMMARY

Accordingly, it is an object of the present invention to provide an improvement in body support systems.

It is another object of the invention to provide an improvement in walker type systems for aiding in the treatment and recovery of persons who have temporarily or permanently lost the use of their legs.

And it is a further object of the invention to provide a compliant walker system for providing dynamic support for an individual while walking or standing upright.

The foregoing and other objects are realized by a compliant walker system comprised of an upright wheeled frame which at least partially surrounds an upright user wearing a body harness which is attached to the frame by means of a cable compliant connection comprised of sets of cable segments and angle bracket members connected between opposite side members of the frame and adjacent side portions of the harness. The type of partial body harness utilized takes two forms, the first comprises a torso harness which completely encircles the waist or rib cage of the user, while the second type of harness comprises a hip harness which fits around the hips and buttocks. The frame itself lends itself to several embodiments, one of which completely surrounds the user. Other embodiments include an open-ended frame including a pair of upright side members which attach to the cable support system and which is adjustable in height to accommodate the particular height of the user.

BRIEF DESCRIPTION OF THE DRAWINGS

The following detailed description of the invention will be more readily understood when considered with the accompanying drawings wherein:

FIG. 1 is a top plan view, partially in phantom, of a first embodiment of the invention;

FIG. 2 is a rear planar view of the embodiment shown in FIG. 1;

FIG. 3 is a side elevational view of the first embodiment shown in FIGS. 1 and 2 and further including a phantom view of a user;

FIG. 4 is a fragmentary perspective view generally illustrative of one type of caster arrangement utilized in connection with the invention;

FIG. 11 is a partial perspective view illustrative of the knock-down capability of the embodiments shown in FIGS. 8–10;

FIG. 12 is a partial perspective view illustrative of one means of closing the torso harness in accordance with the subject invention;

FIG. 13 is a partial perspective diagram illustrative of another means for closing the torso harness in accordance with the subject invention;

FIG. 14 is a partial perspective view of means for raising and lowering the side members of the embodiments shown in FIGS. 8–10;

FIGS. 15 and 16 are partial side and top planar views of an outrigger sub-assembly for the walker frames illustrated herein;

FIG. 17 is a perspective view of a rear hinge arrangement for the torso harnesses shown herein;

FIG. 18 is a perspective view illustrative of one set of cable segments of the cable support system shown in FIG. 17;

FIG. 19 is a top perspective view of an alternate embodiment of a compliant cable, support system used in connection with the embodiment shown in FIGS. 8-10;

FIG. 23 is a rear plan view of a modification of a hip harness shown in FIGS. 20-22.

DETAILED DESCRIPTION OF THE INVENTION

Figure 5:
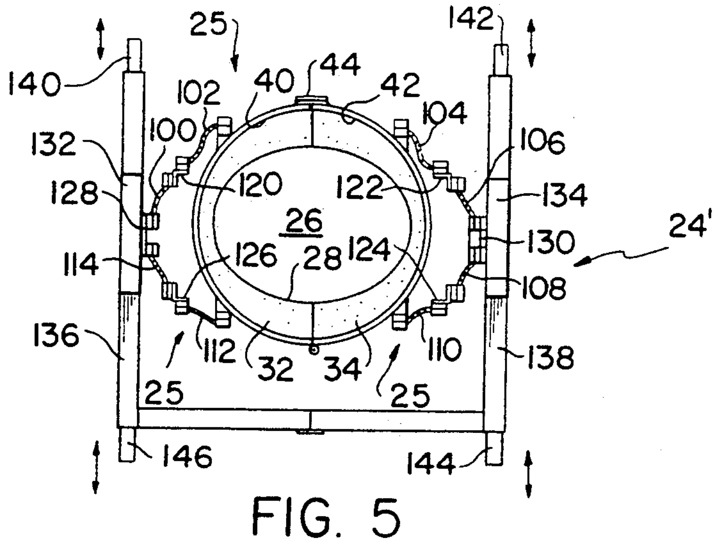
FIG. 5 is a top plan view of a second embodiment of the invention.

Referring now to the drawings and first to FIGS. 1 through 3, reference numeral 24 designates a generally rectangular body support frame of fixed height which is hinged at the rear and which includes a first type body harness 26 comprised of a light rubber inner belt 28 which encircles the waist and/or rib cage portion of an upstanding user 30 (FIG. 3). The inner belt 28 is split into two halves 32 and 34 as shown in FIG. 1, and is attached to a generally circular outer band member 36 which is hinged at the rear by means of a piano type hinge 38 connecting semi-circular outer band portions 40 and 42. A closure member such as shown in FIGS. 12 and 13 may be resorted to.

In the embodiment shown, the device 44 shown in FIG. 12 is depicted. Referring briefly to FIG. 12, the closure 44 is comprised of a pin member 46 which is adapted to be inserted into a pair of separated eyelet type members 48 and 50 on the band portion 42, while an intermediate eyelet member 52 is located on the other hand member 40.

As shown in FIG. 13, an alternate type closure member 44' is illustrated and which is comprised of a hook and pile type of arrangement where, for example, the part 54 attached to the band portion 42 includes a set of hook elements, while the part 58 attached to the band portion 40 includes a pile section 60. This arrangement is well known and marketed under the trademark name of "VELCRO".

Referring now back to FIGS. 1-3, the frame 24 is comprised of two open side frame half sections 62 and 64 which are hinged together by means of a pair of hinges 66 and 68 straddling two vertical brace members 70 and 71 as shown in FIG. 2. Four vertical legs 72, 74, 76 and 78 fit into respective square lower end tube members 80, 82, 84 and 86, on the bottom of which are attached respective wheelchair type casters 88, 90, 92 and 94. Caster 88 is not visible.

When further stability is required, an arrangement such as shown in FIG. 4 can be resorted to where the lower tube member 84, for example, terminates in a pair of right angled extension members 96 and 98 to which casters $92_1$ and $92_2$ are attached.

The torso harness 26 comprises a partial body harness and is one which is adapted to encircle the user 30. The harness 26 is attached to the frame 24 by means of cable compliant support apparatus 25 comprised of eight sets of wire cable segments 100, 102, . . . 112 and 114, with four sets being located in parallel pairs on either side of the harness 26 between upper side rails 116 and 118 (FIG. 1). Each set of cable segments are identical in construction, with one set of cable segments 100 being illustrated for purposes of illustration in FIG. 18. There four equal length cable segments $27_1$, $27_2$, $27_3$ and $27_4$ are held in parallel relationship between two rectangular blocks or end pieces 29 and 31 and are equally separated therebetween. The cable segments $27_1$ . . . $27_4$ can be inserted and swaged into metallic end pieces 27 and 29, however, when desired, the end pieces 27 and 29 can be of molded plastic in which the cable segments $27_1$ . . . $27_4$ are set into place during fabrication. Also, they could be machined parts, when desirable. While four cable segments are shown for purposes of illustration, any number of cable segments $25_n$ can be used depending up the particular design.

Between mutually adjacent sets of end segments, for example, segments 100 and 102, 104 and 106, 108 and 100, and 112 and 114, as shown in FIG. 1, there is located a respective right angle bracket 120, 122, 124 and 126 which are secured thereto. The inside cable segment sets 102, 104, 110 and 112 are bonded to the encircling band portions 40 and 42 of the outer band 26 while the outer sets 100, 106, 108 and 114 are secured by plates 128 and 130 bonded to the side rails 116 and 118, respectively.

When a person 30, for example, as shown in phantom in FIG. 3, is strapped into the torso harness 25 and is standing upright, he can move the frame 24 in any direction by the use of his feet 31, assuming that he has some limited use of his legs 33. If the person 30 when using the compliant walker as shown in FIGS. 1-3 loses his balance or wishes to take the weight off of his legs 33, he simply needs to bend his knees and the complaint cable support structure 25 will hold him up irrespective of his orientation relative to a central vertical axis through the walker structure. One is thus able to take as much weight off the legs 33 as is desired. For example, with 75% of the weight going to the walker 24 and 25% going to the legs 38, a person 30 undergoing rehabilitation can gradually rebuilt leg strength.

A robotic device, not shown, could, if necessary, be attached to the side of the walker 24 so as to raise and lower the user 30 on demand. The cables $27_1$ . . . $27_4$ are strong enough to hold the user securely, yet is flexible enough to allow swaying of the hips during walking and further allowing the person to bend over at the waist to retrieve or put an object down.

The materials from which the compliant walker 24 in accordance with this invention are fabricated can be of any desired type; however, one type of material which is readily usable is the light weight fiber plastics currently being used in space technology.

Figure 6:
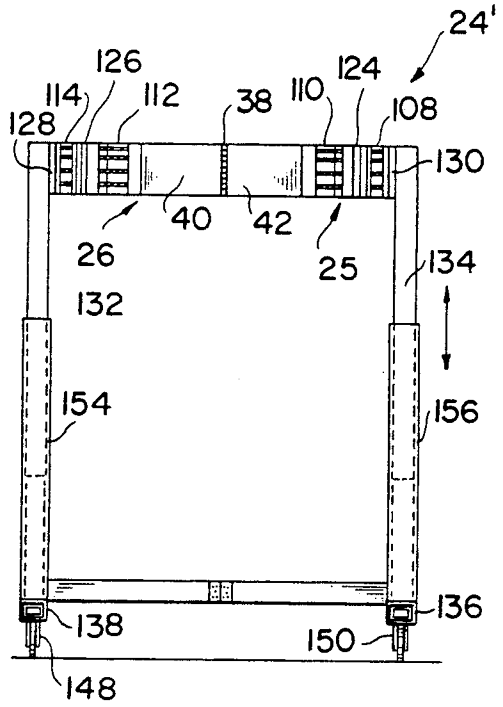
FIG. 6 is a rear planar view of the embodiment shown in FIG. 5.
Figure 7:
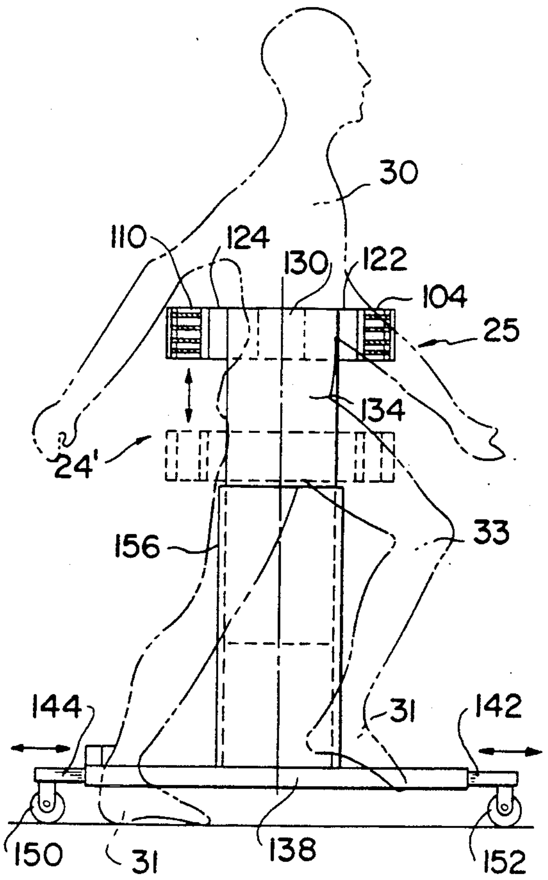
FIG. 7 is a side planar view of the embodiment shown in FIGS. 5 and 6 and further including a phantom view of a user.
Figure 8:
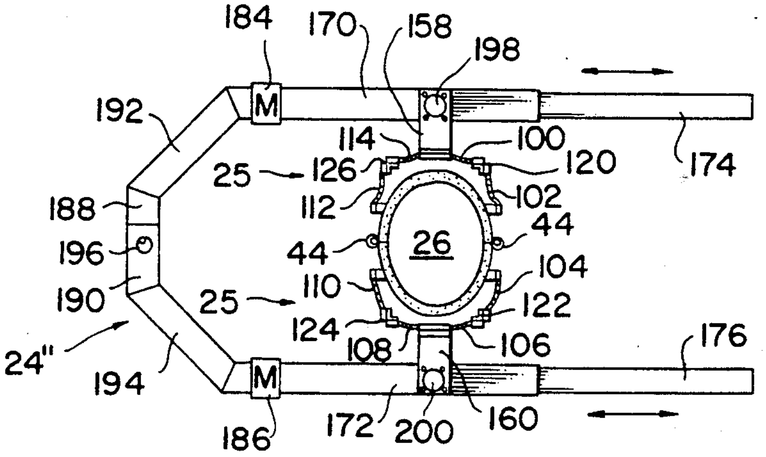
FIG. 8 is a top planar view of a third embodiment of the invention.

This now leads to consideration of the second embodiment of the invention which is disclosed in FIGS. 5 through 7. This embodiment utilizes single upright side support members 132 and 134 located on either side of the user 30 as shown in FIG. 7, while being connected to the compliant cable support system 25 via the plates 128 and 130. The side members 132 and 134 are located midway between a pair of elongated horizontal base members 136 and 138 which additionally include telescoping outrigger members 140, 142, 144 and 146 that can be selectively moved in and out of the respective carriage members 136 and 138 to supply additional stability. Again, four casters, three of which are shown in FIGS. 7 and 8 by reference numerals 148, 150 and 152 permit the whole assembly 24' to be rolled across the floor in any direction The vertical support members 132 and 134, moreover, slide inside of an outer jacket 154 and 156 for permitting the cable support system 25 to be raised and lowered to fit the torso of the user 30 as shown in FIG. 7. Means, not shown, are included for maintaining a desired fixed elevation of the assembly 25. Such means may include, for example, a set of holes and retaining pins through the side surfaces of the upright members 132, 154 and 134, 156.

The embodiment shown in FIGS. 5–7 permits a person using the walker assembly 24' to walk up flush to a counter or work surface, not shown, merely by pushing back the front outrigger members 140 and 142. This embodiment also has an open front (FIG. 5) which makes it easier for the user 30 to carry something while he is walking.

Figure 9:
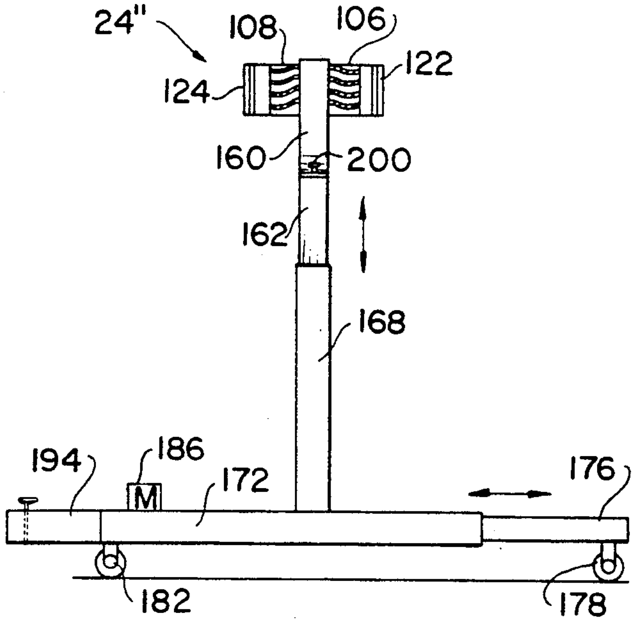
FIG. 9 is a side planar view of the embodiment shown in FIG. 8.
Figure 10:
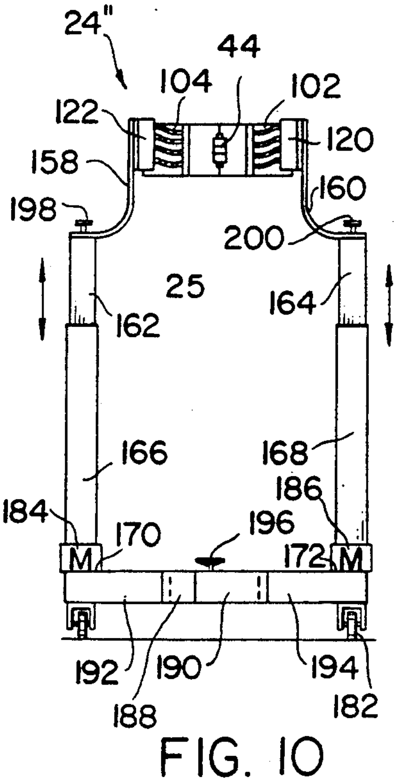
FIG. 10 is a rear planar view of the embodiment shown in FIGS. 8 and 9.

A third embodiment of the compliant walker is shown in FIGS. 8 through 10 and is intended to show, among other things, a "knockdown" assembly 24" which can be readily taken apart and reassembled so that it can be easily transported for travel as well as stored. As depicted, the same torso support system 25 referred to and described above is attached to a pair of side supports 58 and 160; which comprise angulated top support members which attach to the cable support system 25 inwardly of a pair of vertical frame members 162 and 164. The frame members 162 and 164 are height adjustable within vertical channel members 166 and 168 which in turn are secured to elongated horizontal base members 170 and 172 which have telescoping forward extensions 174 and 176 to which is attached a pair of casters 178 and 180 (FIG. 10). A pair of wheels, one of which is shown by reference numeral 182 in FIG. 9, is located at the rear portion of the horizontal frame members 170 and 172 can be motor driven, for example, by respective motors 184 and 186 mounted, for example, above the rear wheels so that the entire assembly can be motor driven under the control of the user. At the rear of the assembly 24", the horizontal frame members 170 and 172 terminate into telescoping end sections 188 and 190 by way of angulated connecting members 192 and 194. This is further shown in FIG. 11 where a metal pin 196 is adapted to pass through the holes 198 and 200 when aligned to lock the two halves of the structure in place for use. With respect to the compliant support structure 25, it is merely modified to provide two equal portions which can be assembled front to back via the eye and pin structure shown in FIG. 12 or, when desirable, by the "VELCRO" arrangement shown in FIG. 13.

Additionally, the side support members 162 and 164 (FIG. 10) are adapted for height adjustment within the lower members 166 and 168. This is provided by a thread or ball screw assembly, not shown, located in the lower frame elements 166 and 168 which couple to respective height adjustment knobs 198 and 200. It is significant to note that the angled side support members 158 and 160 permit users to more freely use their arms because there is less obstruction outwardly to the side.

While the embodiment shown in FIGS. 8–10, for example, only calls for forwardly telescoping front end extensions 174 and 176, when desirable, pivoted outrigger elements such as shown in FIGS. 15 and 16, can be resorted to. As shown, one outrigger element 177 containing a caster 178 is pivotally connected via the pivot 179. This arrangement permits further stability of the walker structure 24" as desired.

A modification of the compliant cable support system can be utilized, for example, with the embodiment shown in FIGS. 8–10 as shown in FIG. 19 and is designated by reference numeral 25'. This configuration consists of rearranging the sets of cable segments 100–114 into a more rectangular arrangement by virtue of the inclusion of elongated back plate members 202 and 204 being attached to the upper vertical portion of the upright side members 158 and 160. This arrangement additionally includes an additional set of right angle brackets 206, 208, 210 and 212 to be used in conjunction with the cable sets 100, 102, 106, 108 and 114. Further, as shown, the right angle brackets 120, 122, 124 and 126 act in conjunction with the angle brackets 206, 208, 210 and 212 to provide a rectangular configuration of the compliant cable structure.

Figure 20:
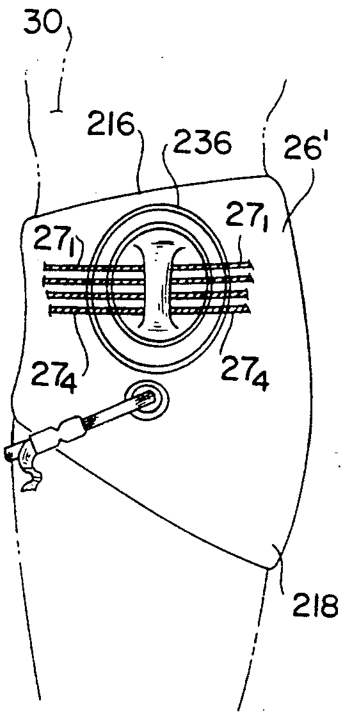
FIG. 20 is a partial side elevation of a hip harness for use in connection with the subject invention.
Figure 21:
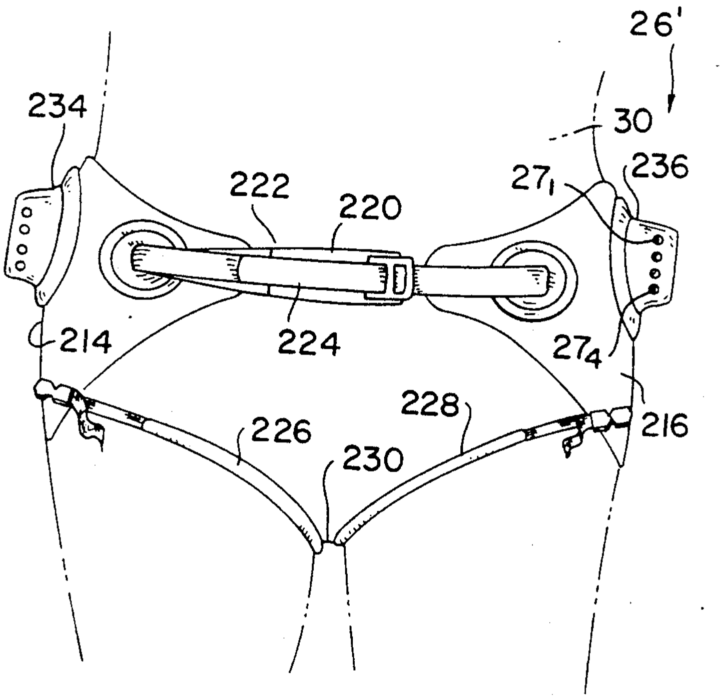
FIG. 21 is a partial front planar view of the hip harness shown in FIG. 20.
Figure 22:
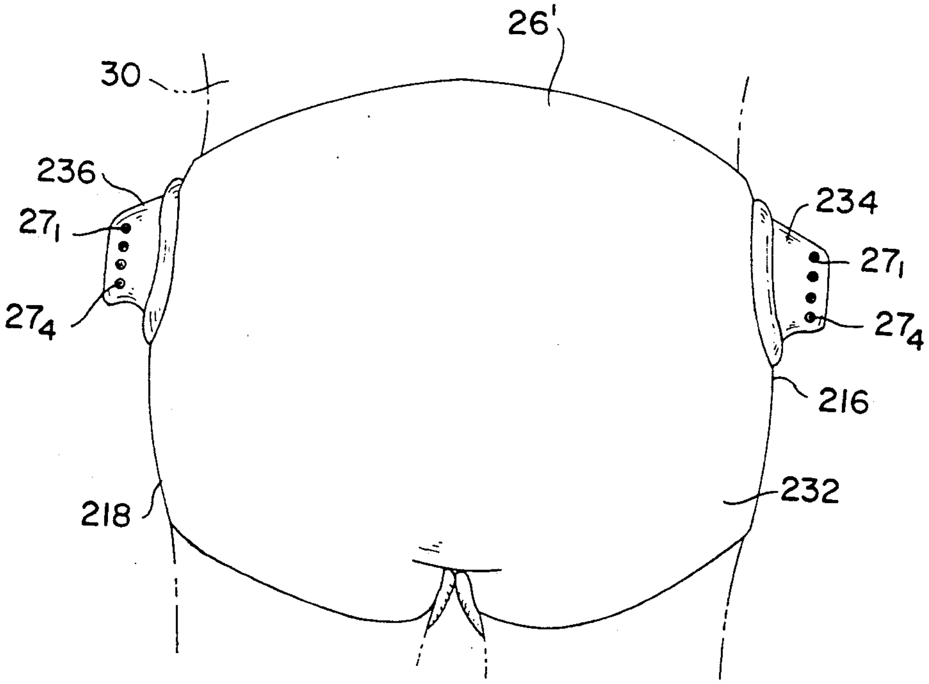
FIG. 22 is a partial rear planar view of the hip harness shown in FIGS. 20 and 21.

While a torso type of partial body harness has been considered thus far, when desirable a hip type of harness can be utilized and is shown in FIGS. 20 through 22. There a girdle type harness structure 26' is adapted to encircle the hip regions 214 and 216 and buttock region 218 while being partially open at the front where it can be drawn together and fastened by means of a belt type closure 20 over the abdomen region 222. The belt type arrangement may be fabricated of nylon and include a "VELCRO" closure section 224. The harness 26', moreover, includes relatively soft quick release elasticized leg straps 226 and 228 which extend from the hip regions 214 and 216 through the crotch area 230 where they attach to the backside portion 232 as shown in FIG. 22.

A pair of cable segment attachment members 234 and 236 are secured to the harness 26' at the hip regions 214 and 216 on either side of the user where cable segments $27_1$, $27_2$, $27_3$ and $27_4$ of two adjacent cable segment sets, e.g. 102, 112 and 104, 110, such as shown in FIG. 19. Thus instead of being supported in the upper region of his body, the user 30 is now supported around his hips and seat.

A variation of this type of harness is shown in FIG. 23 where the cable attachment member at the hip is modified as a structure 234' where a vertical extension 238, as well as another, not shown, on the other side of the wearer 30 descends to knee level where it terminates in a cable attachment portion 240 where it would then attach to a suitable frame structure as shown above, but modified for the lower height.

Thus what has been shown and described is a compliant walker structure for dynamically supporting a person having limited use of his or her legs. It is particularly useful as an aid in rehabilitation for patients who have temporary or permanent loss of the use of their legs. Furthermore, it can be used by the public as a mobile assist device for the physically handicapped.

Having thus shown and described what is at present considered to be the preferred embodiments of the invention, it should be noted that the same has been made by way of illustration and not limitation. Accordingly, all modifications, alterations and changes coming within the spirit and scope of the invention as set forth in the appended claims are herein meant to be included.

We claim:

1. A compliant walker for aiding persons having limited use of their lower extremities, comprising:
 - a wheeled frame including upright support means;
 - body harness means;
 - cable compliance means connected between said body harness means and said upright support means for flexibly holding and supporting a person in a substantially upright position while said person sags in said frame when taking weight off said lower extremities;

said cable compliance means includes a plurality of cable segments and angle brackets arranged in sets of parallel cable segments, said cable segments being coupled at one end to a respective angle bracket and at the other end selectively to said harness or said upright support means.

2. The compliant walker of claim 1 wherein each said set of cable segments terminate in respective pairs of end members and wherein said end members selectively attach to said harness and said upright support means.

3. The compliant walker of claim 2 wherein four sets of cable segments are arranged within said frame on either side of said harness means in parallel pairs and having an intermediate angle bracket coupled between each set of a pair.

4. The compliant walker of claim 1 wherein angle bracket comprises a right angle bracket.

5. The compliant walker of claim 1 wherein each set of cable segments includes at least two cable segments.

6. The compliant walker of claim 1 wherein said body harness means incudes a relatively soft inner belt member and a relatively stiffer outer band member connected to said compliance means.

7. The compliant walker of claim 1 wherein said body harness means comprises a harness engaging an upper torso portion of said person.

8. The compliant walker of claim 1 wherein said harness encircles said upper torso portion.

9. The compliant walker of claim 1 wherein said body harness means comprises a girdle type harness engaging the hips of said person.

10. The compliant walker of claim 9 wherein said parallel sets of cable segments couple to hip regions of said girdle type harness.

11. The compliant walker of claim 1 wherein said upright support means of said wheeled frame are hinged together so as to permit ingress and igress to and from said harness means.

12. The compliant walker of claim 11 wherein said harness means is separable to permit said person to get in and out of said harness.

13. The compliant walker of claim 1 wherein said upright support means includes side support means.

14. The compliant walker of claim 13 wherein said side support means are adjustable in height.

15. The compliant walker of claim 13 wherein said wheeled frame includes a pair of substantially horizontal elongated wheeled side members and wherein said upright support means comprises a substantially vertical support member coupled at one end to a respective side member of said pair of side members and at the other end to said compliance means.

16. The compliant walker of claim 15 wherein each said vertical support member includes an inwardly angulating offset member located between the upper end of said vertical support member and said compliance means for reducing frame obstruction in relation to the arms of said person.

17. The compliant walker of claim 16 wherein each said vertical support member includes means for varying the height of said compliance means.

18. The compliant walker of claim 13 wherein said side support means comprises a pair of horizontal base members including means for selectively extending the respective lengths thereof.

19. The compliant walker of claim 18 wherein said pair of horizontal base members include outrigger type means for enhancing the stability of said wheeled frame.

20. The compliant walker of claim 1 wherein said wheeled frame comprises a knock down structure for easy disassembly and reassembly to facilitate transportation and storage of the walker when not in use.

21. The compliant walker of claim 20 wherein said body harness means is comprised of two separable halves.

22. The compliant walker of claim 20 wherein said wheeled frame incudes a pair of side members including said upright support means and additionally including at least one cross member comprised of two interconnecting parts and including means for preventing separation when joined together.

23. The compliant walker of claim 1 wherein said wheeled frame includes a set of wheels mounted thereon and additionally including motor means for powering said wheels.

* * * * *